(12) United States Patent
Takahama

(10) Patent No.: US 7,715,192 B2
(45) Date of Patent: May 11, 2010

(54) STRAP ATTACHABLE MOBILE DEVICE

(75) Inventor: Osamu Takahama, Suita (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 12/243,430

(22) Filed: Oct. 1, 2008

(65) Prior Publication Data

US 2009/0086440 A1    Apr. 2, 2009

(30) Foreign Application Priority Data

Oct. 2, 2007    (JP)    ............................ 2007-258242

(51) Int. Cl.
    *G06F 1/16*    (2006.01)
(52) U.S. Cl. .............................. 361/679.59; 361/679.56
(58) Field of Classification Search ............ 361/679.55, 361/679.01, 679.02, 679.58, 679.56
    See application file for complete search history.

(56) References Cited

U.S. PATENT DOCUMENTS

| | | | | |
|---|---|---|---|---|
| 4,839,837 | A * | 6/1989 | Chang .................... | 361/679.09 |
| 5,155,659 | A * | 10/1992 | Kunert ................... | 361/679.56 |
| 6,017,106 | A * | 1/2000 | Adams et al. .......... | 361/679.55 |
| 6,208,504 | B1 * | 3/2001 | Cho et al. .............. | 361/679.59 |
| 6,532,152 | B1 * | 3/2003 | White et al. ........... | 361/679.59 |
| 6,560,092 | B2 * | 5/2003 | Itou et al. .............. | 361/679.55 |
| 6,942,153 | B1 * | 9/2005 | Yuan et al. ............. | 361/679.56 |
| 6,977,809 | B2 * | 12/2005 | Bovino ................... | 361/679.55 |
| 6,995,977 | B2 * | 2/2006 | Yang ...................... | 361/679.55 |
| 7,023,692 | B2 * | 4/2006 | Mansutti et al. ........ | 361/679.56 |
| 7,342,778 | B2 * | 3/2008 | Fan et al. ................ | 361/679.55 |
| 7,388,742 | B2 * | 6/2008 | Cargin et al. ........... | 361/679.01 |
| 2002/0044406 | A1 * | 4/2002 | Shimoda et al. ............. | 361/679 |

FOREIGN PATENT DOCUMENTS

| | | |
|---|---|---|
| JP | 11-054947 A | 2/1999 |
| JP | 2003-084358 A | 3/2003 |
| JP | 2006-084653 A | 3/2006 |
| JP | 2006-269642 A | 10/2006 |

* cited by examiner

*Primary Examiner*—Lisa Lea-Edmonds
(74) *Attorney, Agent, or Firm*—Westerman, Hattori, Daniels & Adrian, LLP

(57) ABSTRACT

A mobile device includes a pair of cabinet half-bodies 10, 6 configuring a cabinet 1; a metal coupling member 2 for coupling the cabinet half-bodies 10, 6; and a synthetic resin cover body 3 opened with at least two pass holes 30, 30 through which a strap 4 is passed, and arranged with a strap receiving piece 31 between the pass holes 30, 30. The strap receiving piece 31 has a lower surface reinforced by contacting at least one part of the coupling member 2, and a space through which the strap 4 from one pass hole to the other pass hole passes is formed below the coupling member 2.

4 Claims, 5 Drawing Sheets

F I G. 1
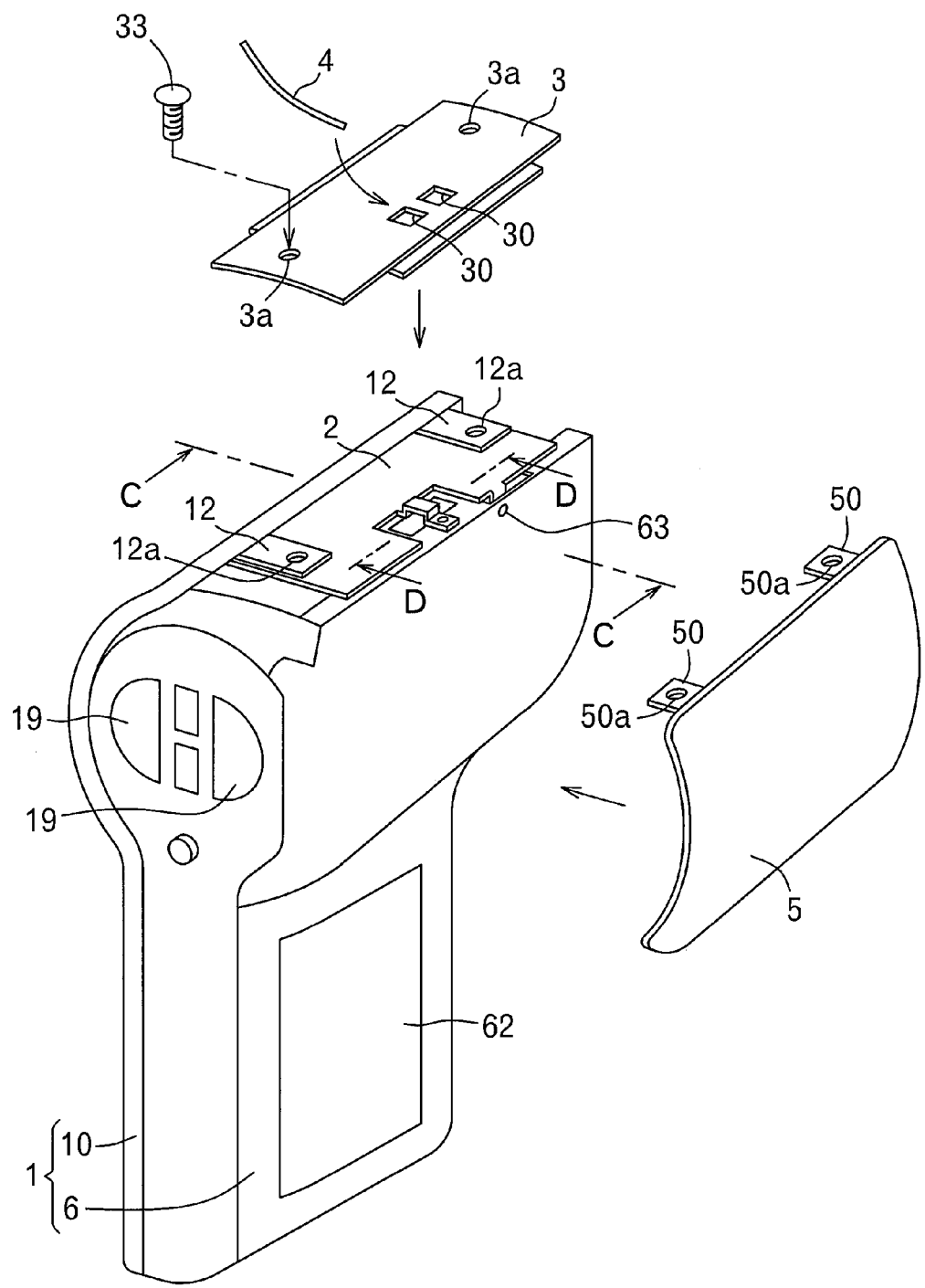

F I G. 3
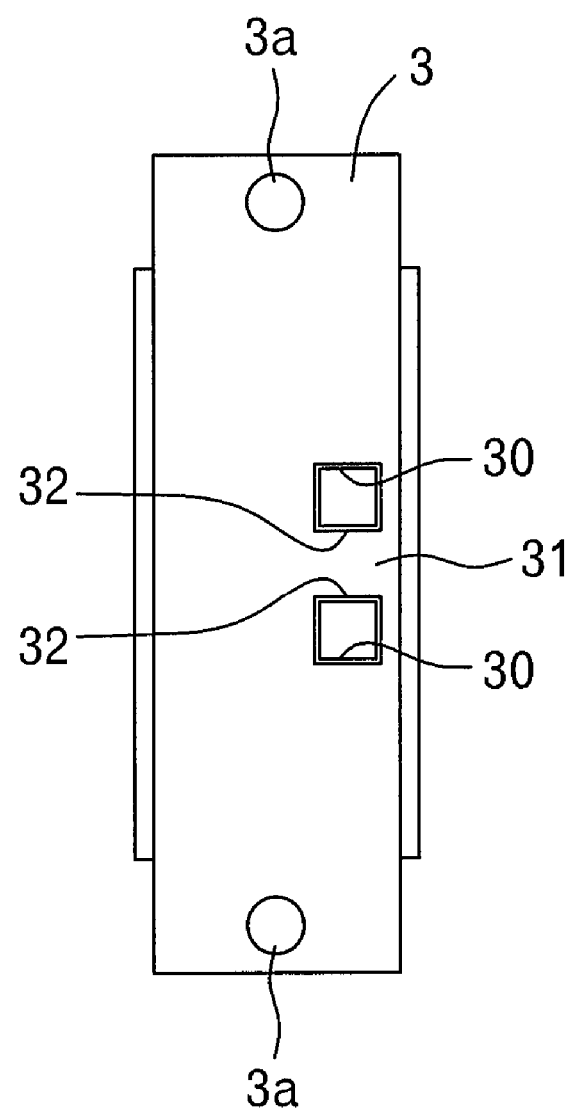

STRAP ATTACHABLE MOBILE DEVICE

CROSS REFERENCE OF RELATED APPLICATION

This application claims priority based on Japanese patent Application 2007-258242 filed on Oct. 2, 2007.

BACKGROUND OF THE INVENTION

1. Field of the Invention

The present invention relates to a mobile device such as digital camera and mobile phone to which a strap gripped by a user can be attached.

2. Description of the Related Art

FIG. 6 is a perspective view seen from a rear surface of a conventional mobile device, specifically, a mobile phone, and FIG. 7 is a cross-sectional view cut along a plane including line A-A at one part of FIG. 6.

A case body (7) is configured by overlapping a front cabinet (70) and a rear cabinet (71), and a strap attachment piece (73) arranged on the front cabinet (70) is projected from an opening (72) opened at the rear cabinet (71). A pass-through hole (74) is formed at a distal end of the strap attachment piece (73) at a site positioned on the outer side of the rear cabinet (71), and a strap (4) or a string body is attached to the pass-through hole (74). When the strap (4) is pulled, the strap attachment piece (73) bends in a direction of an arrow B, and the strap attachment piece (73) pushes the rear cabinet (71) to closely attach to the front cabinet (70). The front cabinet (70) and the rear cabinet (71) are thus less likely to be detached.

Other than the above conventional examples, various structures for attaching the strap (4) have been proposed. However, miniaturization is desired for such type of mobile device, and the location of attaching the strap (4) is sometimes narrow. Most cabinet of the mobile device is made of synthetic resin, and thus if the location of attaching the strap (4) is narrow, the strength of the relevant location may not be maintained.

The present invention provides a mobile device capable of maintaining the strength at the location of attaching the strap even if such location is narrow.

SUMMARY OF THE INVENTION

A mobile device of the present invention includes a pair of cabinet half-bodies (10), (6) configuring a cabinet (1); a metal coupling member (2) for coupling the cabinet half-bodies (10), (6); and a synthetic resin cover body (3) opened with at least two pass holes (30), (30) through which a strap (4) is passed, and arranged with a strap receiving piece (31) between the pass holes (30) (30).

The strap receiving piece (31) has an inner surface reinforced by at least one part of the coupling member (2), and a space K through which the strap (4) from one pass hole to the other pass hole passes is formed below the coupling member (2).

An inner surface of the strap receiving piece (31) of the cover body (3) is reinforced by the coupling member (2), specifically by contacting, and the strap (4) passes under the coupling member (2). When the strap (4) is pulled, the tension load is received at the coupling member (2).

Thus, the strength of the strap receiving piece (31) is maintained and the strap receiving piece (31) will not be damaged nor deformed even if the location for attaching the strap (4) is narrow and the strap receiving piece (31) is made of resin and formed thin since the strap receiving piece is reinforced by the metal coupling member (2).

BRIEF DESCRIPTION OF THE DRAWINGS

FIG. 1 is a perspective view of a cabinet of a mobile device according to an example of the present invention;

FIG. 3 is a rear view of a cover body;

DETAILED DESCRIPTION OF THE PREFERRED EMBODIMENTS

One example of the present invention will be specifically described with reference to the figures.

Figure 2:
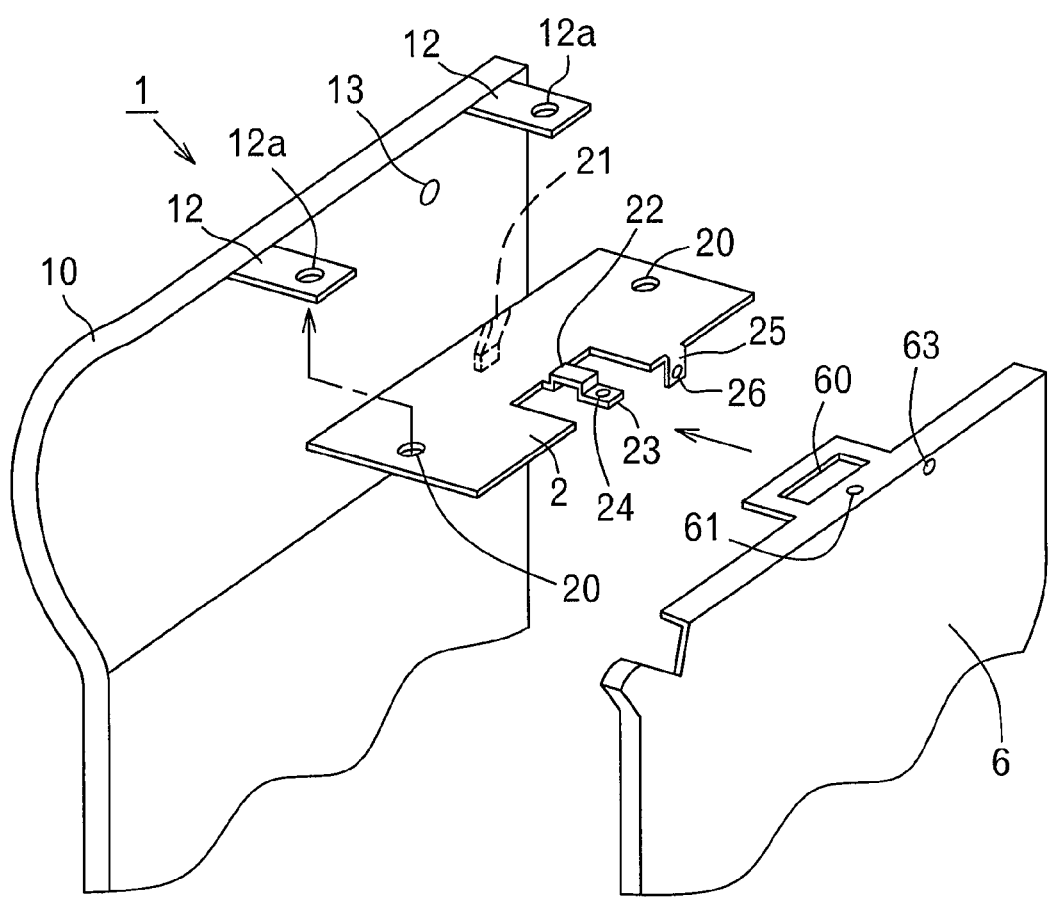
FIG. 2 is an exploded perspective view of the cabinet of FIG. 1.

FIG. 1 is a perspective view of a cabinet (1) of a mobile device according to the present example, specifically, a digital camera, and FIG. 2 is an exploded perspective view of the cabinet (1) of FIG. 1 excluding a cover body (3). The cabinet (1) is configured by combining a first cabinet half-body (10) and a second cabinet half-body (6) including a liquid crystal panel (62), wherein both cabinet half bodies (10), (6) are made of synthetic resin, and are connected by a metal coupling member (2) positioned at the upper ends. As well known in the art, operation buttons (19), (19) are arranged on the back surface of the cabinet (1), and a lens tube (not shown) is accommodated at a front end.

The coupling member (2) is formed by press working a metal plate, and the synthetic resin cover body (3) having a cross-section of circular arc shape and having the bulging part facing upward is covered on the coupling member (2). Arm pieces (12), (12) are projected inward from the upper end of the first cabinet half-body (10), and the cover body (3) is supported by the arm pieces (12), (12). A decorative cover (5) is covered on the side surface of the second cabinet half-body (6), and projections (50), (50) are projected inward from the upper end of the decorative cover (5). The projections (50), (50) are interposed between the arm pieces (12), (12) and the coupling member (2). First screw holes (20), (20) are opened in the coupling member (2), and the cover body (3), the arm piece (12), and the projection (50) are respectively formed with holes (3a), (12a), (50a) to be aligned with the first screw hole (20). The cover body (3), the arm piece (12), the projection (50), and the coupling member (2) are inserted from the outer side of the cover body (3), and fixed by a screw (33) to be screw-fit to the first screw holes (20), (20).

The cover body (3) is formed with two rectangular pass holes (30), (30) spaced apart from each other, and the strap (4) is passed therethrough. In other words, the strap (4) is inserted from one pass hole (30) to the inner side, and exit to the outer side from the other pass hole (30). The lens tube is arranged at a lower side of the coupling member (2), wherein a space between an upper surface of the coupling member (2) and a lower surface of the cover body (3) is made narrow to satisfy the demand of miniaturization of the entire cabinet (1). The strap (4) is passed through the narrow space, and the following devisal is made to ensure the strength of the cover body (3) even if a tension load is applied to the strap (4).

FIG. 3 is a rear view of the cover body (3). A strap receiving piece (31) or the rear surface of the cover body (3) between the pass holes (30), (30) is formed thinner than the peripheral portion.

As shown in FIG. 2, the coupling member (2) has a leg piece (21) integrally arranged on the first cabinet half-body (10) side, and a convex part (22) bulging upward on the second cabinet half-body (6) side, and a flat plate shaped supporting piece (23) is projected towards the second cabinet half-body (6) from the lower end of the convex part (22). The coupling member (2) has an attachment piece (25) projecting downward towards the second cabinet half-body (6) side.

The second cabinet half-body (6) is formed with a concave surface (60) positioned on the lower side of the convex part (22), a second screw hole (61) aligned with the supporting piece (23), and a pass-through hole (63) facing the attachment piece (25). A screw (not shown) is passed through the pass-through hole (63) and screwed into a third screw hole (26) opened in the attachment piece (25) to couple the second cabinet half-body (6) and the coupling member (2).

The supporting piece (23) is formed with a pass-through hole (24) to be aligned with the second screw hole (61), and a screw (27) (see FIG. 4) is passed through the pass-through hole (24) and screwed into the second screw hole (61) thereby preventing the convex part (22) from lifting upward.

A fourth screw hole (13) is opened at the side surface of the first cabinet half-body (10), wherein a screw (14) (see FIG. 4) is screwed into the fourth screw hole (13) through the leg piece (21), so that the first cabinet half-body (10) and the coupling member (2) are coupled. The cabinet half-bodies (10), (6) are securely coupled by the metal coupling member (2).

Figure 4:
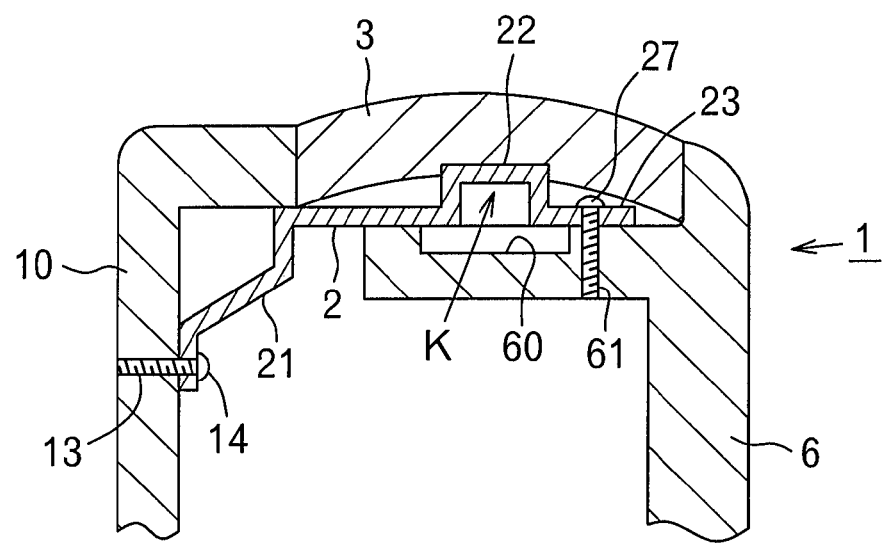
FIG. 4 is a cross-sectional view cut along a plane including line C-C in FIG. 1.
Figure 5:
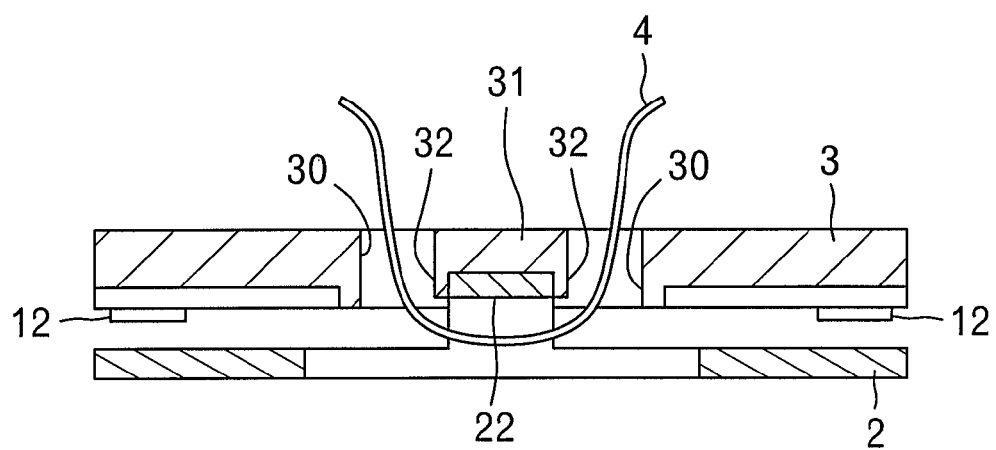
FIG. 5 is a cross-sectional view cut along a plane including line D-D in FIG. 1.
Figure 6:
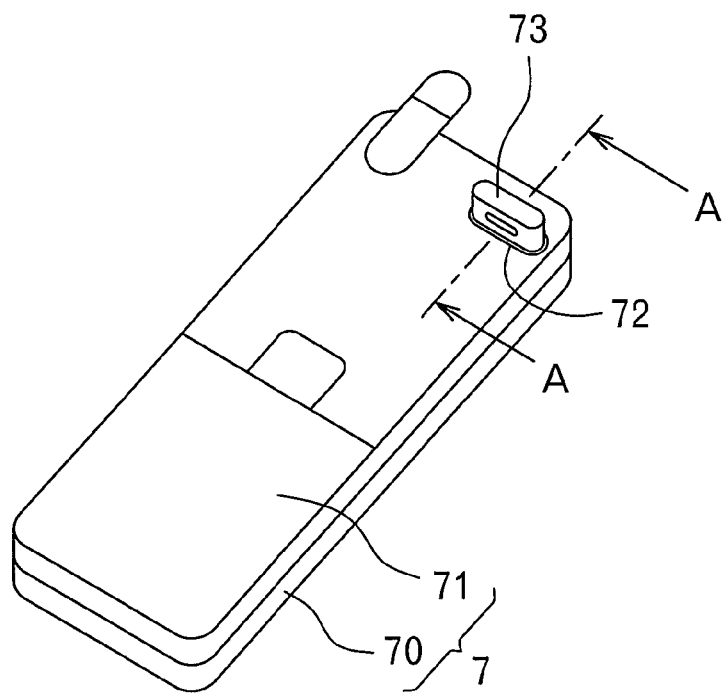
FIG. 6 is a perspective view seen from a rear surface of a conventional mobile device.
Figure 7:
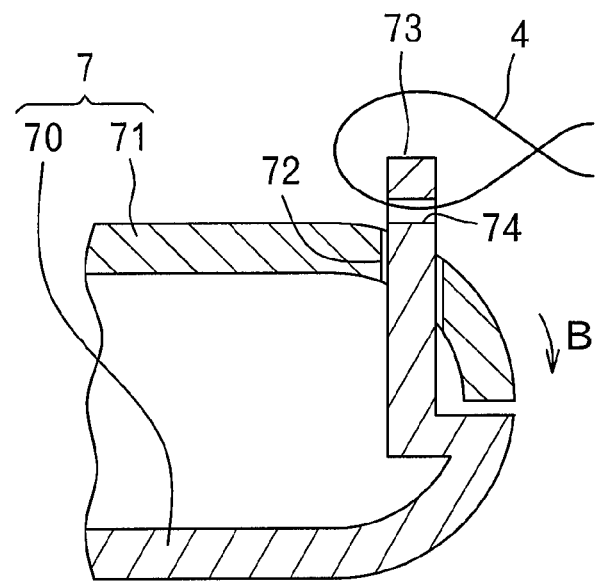
FIG. 7 is a cross-sectional view cut along a plane including line A-A at one part of FIG. 6.

FIG. 4 is a cross-sectional view cut along a perpendicular plane including line C-C in FIG. 1, wherein the decorative cover (5) is omitted for the sake of convenience of explanation. FIG. 5 is a cross-sectional view cut along a perpendicular plane including line D-D in FIG. 1. With the coupling member (2) coupling the cabinet half-bodies (10), (6), the convex part (22) and the concave surface (60) overlap, and the strap (4) is passed through a space K between the lower side of the convex part (22) and the concave surface (60). The upper surface of the convex part (22) and the lower surface, that is, the inner surface of the strap receiving piece (31) are aligned. When the strap (4) is pulled, at least one part of the tension load is received by the convex part (22).

The strength of the strap receiving piece (31) is maintained and the strap receiving piece (31) will not be damaged nor deformed even if the location for attaching the strap (4) is narrow and the strap receiving piece (31) is made of resin and formed thin since the strap receiving piece is reinforced by the metal concave part (22).

In FIG. 5, the upper surface of the convex part (22) and the lower surface of the strap receiving piece (31) contact, but do not necessarily need to contact. In particular, the upper surface of the convex part (22) and the lower surface of the strap receiving piece (31) may not contact in a state where force is not applied by the strap (4) so that the strap receiving piece (31) and the convex part (22) contact.

As shown in FIG. 5, protective pieces (32), (32) are projected downward from both sides of the strap receiving piece (31). The width of the convex part (22) is narrower than that of the strap receiving piece (31), and the convex part (22) is fitted between the protective pieces (32), (32). The convex part (22) is at a position depressed more than the protective pieces (32), (32). The strap (4) passed through both pass holes (30), (30) is prevented from touching the edge of the convex part (22) in the above manner.

Since the convex part (22) is formed by press working the metal plate, burr in punching work tends to produce at the edge of the convex part (22). The width of the convex part (22) is formed narrower than that of the strap receiving piece (31) to narrow the spacing between the protective pieces (32), (32), thereby preventing the strap (4) from touching the burr and preventing the strap (4) from being damaged when the strap (4) is slidably moved.

The strap (4) is further prevented from touching the burr by coinciding the pointed direction of the burr produced in press working of the coupling member (2) with the direction (upward) towards the strap receiving piece (31).

A digital camera has been described as a mobile device including a strap in this example, but may be other devices such as mobile phone. The number of pass holes (30) is not limited to two and may be three or more.

What is claimed is:

1. A mobile device comprising:
   a pair of cabinet half-bodies configuring a cabinet;
   a metal coupling member for coupling the cabinet half-bodies; and
   a synthetic resin cover body opened with at least two pass holes through which a strap is passed, and arranged with a strap receiving piece between the pass holes; wherein the strap receiving piece has an inner surface reinforced by at least one part of the coupling member, and a space through which the strap from one pass hole to the other pass hole passes is formed below the coupling member.

2. The mobile device according to claim 1, wherein the coupling member is integrally formed with a convex part which upper surface is positioned at a lower surface of the strap receiving piece, a width of the convex part being formed narrower than a width of the strap receiving piece.

3. The mobile device according to claim 2, wherein a protective piece is projected from both sides of the strap receiving piece, and the convex part is at a position depressed more than the protective piece between the protective pieces.

4. The mobile device according to claim 1, wherein one cabinet half-body, the coupling member, and the cover body are co-fixed with one screw.

* * * * *